Jan. 22, 1963  W. A. ESCHENBURG ETAL  3,074,210
COMBINATION SANDER
Filed July 28, 1959  10 Sheets-Sheet 1

INVENTORS.
William A. Eschenburg,
BY Harry C. Marks,
Cromwell, Greist & Warden
Attys

Fig. 3

INVENTORS
William A. Eschenburg,
BY Harry C. Marks,
Cromwell, Greist & Warden

Fig. 5.

INVENTORS.
William A. Eschenburg
BY Harry C. Marks,
Cromwell, Greist & Warden
Attys.

3,074,210
COMBINATION SANDER
William A. Eschenburg and Harry C. Marks, Beloit, Wis., assignors to Yates-American Machine Company, Beloit, Wis., a corporation of Delaware
Filed July 28, 1959, Ser. No. 830,004
21 Claims. (Cl. 51—138)

This invention relates to work surfacing machines and is more particularly concerned with improvements in machines for finishing the surface of wood or similar materials.

Surface abrading machines which have heretofore been provided for the finishing of wood panels or like members having flat surfaces are of two general types, roll or drum and traveling belt. Although the roll or drum type sanding machine may be used for fine finishing by employing abrasives of suitable grade and subjecting the work to successive operations, this type machine has generally been employed for rough work only where the removal of a substantial amount of material is desired so as to bring the work piece to a definite thickness. When employed for a finishing operation, the drum type machine has many disadvantages and generally does not provide a satisfactory finish. On the other hand, the belt type machines have generally been employed for fine finish work only since the depth of cut is generally less and the straight line scratch pattern produced is less noticeable, particularly when it runs in the direction of the grain. Consequently, it is common practice in finishing the surface of a wood panel or other work piece to drum sand to the desired thickness and then perform the final finishing operation with a traveling belt or stroke sander. This usually requires a substantial amount of handling of the work since it must be passed through at least two separate machines. Conventional drum sanders are in use today which employ a number of drums or rolls with different grades of abrasive surfaces so as to provide for successive cuts at different depths and finishes but these machines do not provide a satisfactory surface polish for the application of the coating materials commonly used in wood finishing. Conventional wide belt sanders which are available usually require stock that has already been drum sanded and most often they are not designed to satisfactorily finish short or warped pieces.

It is a general object of the present invention to provide in a single machine a combination of abrasive units for finishing the surface of wood or other material that may vary in thickness, which machine will reduce the stock to a predetermined thickness and provide a superior finish on the surface in one pass of the stock through the machine.

Another object of the invention is to provide a surface finishing machine comprising a combination of interchangeable abrasive units which are adapted to operate successively on the surface of stock conveyed through the machine, the interchangeability permitting the employment in a single machine of one or more sanding drums and one or more endless belts so as to obtain the advantages of both drum sanding and belt sanding.

It is a more specific object of the invention to provide a surface finishing machine which comprises a single base structure having an endless conveyor mounted thereon which constitutes a traveling work supporting bed, one or more drum sanding units adapted to be mounted on the base at the work receiving end of the traveling bed, and one or more endless belt sanding units adapted to be mounted on the base adjacent the drum unit or units with the sanding belt or belts traveling in vertical paths and having a pressure roller or flexible platen for contacting the work carried on the traveling bed.

Another object of the invention is to provide a combination drum and belt sanding machine wherein a horizontal traveling work supporting bed is mounted on an upright frame and drum and belt sanding units are mounted above the bed with each of the units having associated with it a combined work engaging platen and dust exhaust hood for holding the work in proper relation to the sanding unit and for removing the dust resulting from the operation of the unit.

It is another object of the invention to provide a surface finishing machine having a supporting frame on which a traveling conveyor is mounted so as to form a moving work supporting bed and a plurality of sanding units supported above the traveling bed with the work contacting portion of each of the units being adjustable vertically so as to vary the depth of cut or pressure applied to the work as it is carried beneath the successive units.

Another object of the invention is to provide in a machine of the character described one or more vertically disposed endless belt sanding units, each of which is supported on a cross frame which is attached to a fixed bracket at one side of the machine and which extends across the work supporting bed with the belt carried at the bottom of the cross frame on a contact roller having an adjustable mounting so that its vertical position may be varied and with the belt carried at the upper end of the frame on a tensioning roller having its opposite ends journaled in bearing blocks which are in turn supported on the upper ends of vertically disposed pneumatically or hydraulically operated pistons, which pistons have a rack and pinion connection with opposite ends of a movement equalizing cross shaft which is journaled in the cross frame.

Another object of the invention is to provide a sanding machine having a vertically disposed endless belt sanding unit wherein the belt is supported at the top and bottom of a vertically disposed frame with the bottom support including a transversely extending platen having a flexible surface which is mounted on a supporting cross bar with an improved pressure equalizing clamp.

It is another object of the invention to provide in a sanding machine a vertically disposed traveling belt sander unit having a lower belt supporting work contacting roller and an upper tensioning and tracking roller, with the latter roller being journaled at opposite ends in bearing members, one of which is mounted for swinging movement on a vertical pivot at the top of a vertically movable piston while the other bearing member is mounted for horizontal sliding movement on the top of another vertically movable piston and a pneumatic or hydraulic means is provided for moving the slidably mounted bearing, with the latter under the control of position sensing members located adjacent an edge of the traveling belt and being operative to move the bearing in response to lateral movements of the belt edge so as to maintain proper tracking of the belt on the rollers.

It is another object of the invention to provide a drum type sanding unit with a mounting therefor which permits equalized vertical adjustment at opposite ends of the drum while it is in operation.

It is a further object of the invention to provide a sanding machine of the type described having one or more sanding drums or rolls which engage the work wherein the roll or rolls are mounted on pairs of swinging frame members, with each pair thereof being pivoted on an axis parallel with the axis of the roll and wherein vertical adjustment of each roll is provided by a rotatable cross shaft having axially movable wedge members mounted thereon which are positioned to engage with a cooperating surface on the supporting frame members for the roll and to raise and lower the same.

It is a still further object of the invention to provide a sanding machine having a sanding drum which is journaled at opposite ends in pivotally mounted side arm members and a rotatably mounted cross shaft having axially movable adjusting wedges at opposite ends which are engageable with the supporting side arms for the drum and which carry in pivoted relation thereon yieldable platen fingers for engaging with the work so as to hold the same against a supporting bed while it advances beneath the sanding drum.

Another object of the invention is to provide an improved oscillating mechanism for a drum type sanding unit.

These and other objects and advantages of the invention will be apparent from a consideration of the machine which is shown by way of illustration in the accompanying drawings wherein:

FIGURE 14 is a cross section taken on line 14—14 of FIGURE 12;

The machine illustrated in the drawings is particularly adapted for finishing the surface of wood panels or like work pieces and is designed to handle work pieces of relatively large size. It comprises a relatively heavy rugged upright base 10 which includes laterally disposed side frame members 11 and 12 between which is supported a vertically adjustable, horizontally disposed rectangular frame 13 on which a traveling conveyor 14 is mounted with the upper run thereof providing a work supporting bed. The side frames 11 and 12 also support on their upper edges a series of sanding units which, in the form of the machine illustrated, comprise a drum sanding unit 15 at the infeed end of the bed frame 13 and two longitudinally spaced, vertically disposed endless belt sanding units 16 and 17. The drum sanding unit 15 is positioned forwardly of a combination work engaging platen and dust collecting chute 18 which extends vertically and transversely of the machine. A similar combination platen and dust collecting chute 20 is positioned between the drum sanding unit 15 and the first belt sanding unit 16. A like unit 21 extends between the belt units 16 and 17 and a final dust collecting chute 22 extends across the top of the base 10 at the discharge end of the machine, which also supports a hold down roller 23.

The rectangular frame 13 (FIGURES 1, 3 and 5) on which the work supporting conveyor 14 is mounted comprises vertically disposed side plates 25 and 25' which carry on their outer side faces pairs of vertically disposed, longitudinally spaced, guide plates or rails 26 and 26' which are received in sliding relation in the inwardly facing rack forming grooves 27 and 27' of vertically disposed, longitudinally spaced pairs of gibs or guide bracket members 28 and 28' secured on the inside of the side frame members 11 and 12 adjacent the top portions of the four corners of the base frame 10. The side plates 25 and 25' carry on the outside faces adjacent the pairs of guide rails 26 and 26' pairs of longitudinally spaced nuts 30 and 30' which form part of the vertical hoist for the bed frame 13. The nuts 30 and 30' travel on the threaded upper ends of vertically disposed pairs of hoist shafts 31 and 31' which are journaled in vertically spaced bearing members provided in the bracket formations 32 and 32' in the side frames 11 and 12 at the four inside bottom corners of the base frame 10. The vertical shafts 31 and 31' are provided at their bottom ends with bevel gears 33 and 33' which are in toothed engagement with bevel gears 34 and 34' on the ends of cross shafts 35 and 36, the latter being journaled at opposite ends in the bearing blocks 37 and 37' which are mounted in the corner bracket formations 32 and 32' at the bottom corners of the side frame members 11 and 12. The shafts 35 and 36 carry pinions 38 and 39 at one end which are in engagement with worm gears 40 and 41 on the ends of a longitudinally extending drive shaft 42. The shaft 42 is journaled at its opposite ends in the outer end walls of the bearing bracket formations 32 and 32' and has a pinion 43 which is in driving engagement with a pinion 44 on the end of the power output shaft of a drive motor 45, the latter being mounted on the side frame member 11 at the discharge end of the machine. The longitudinal drive shaft 42 which constitutes the power or drive shaft for the frame hoist is extended at the front or work receiving end of the machine and provided with a hand wheel 46 for manual operation.

Figure 1:
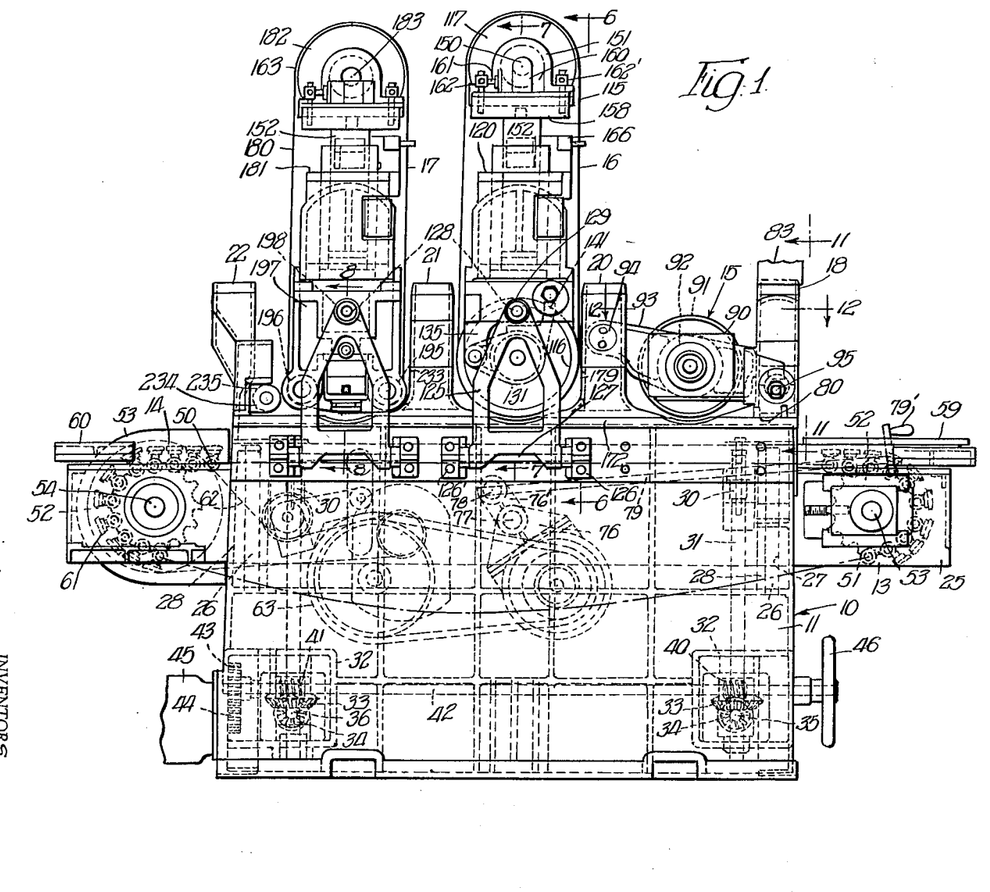
FIGURE 1 is a side elevation of a sanding machine having the principal features of the invention incorporated therein.
Figure 3:
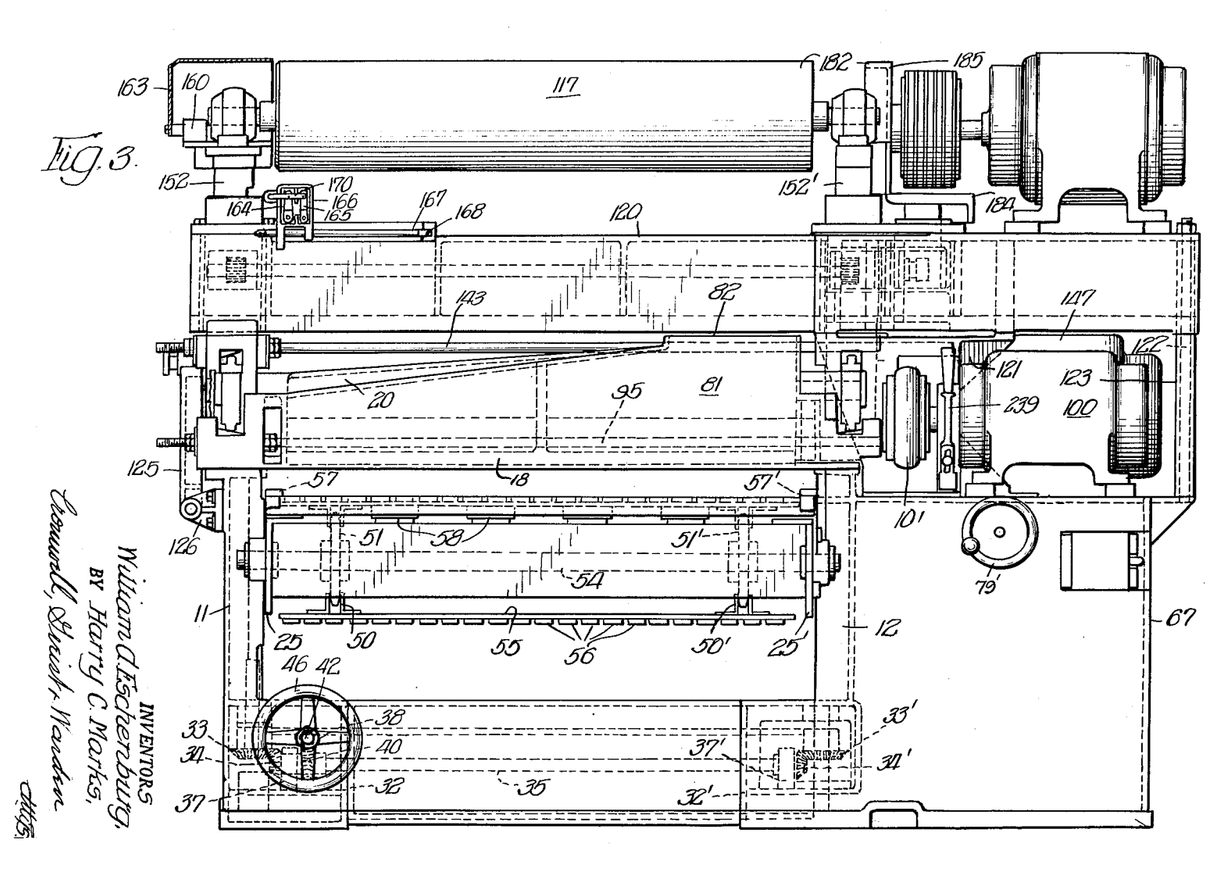
FIGURE 3 is an end elevation of the machine at the work receiving end thereof with portions broken away.
Figure 4:
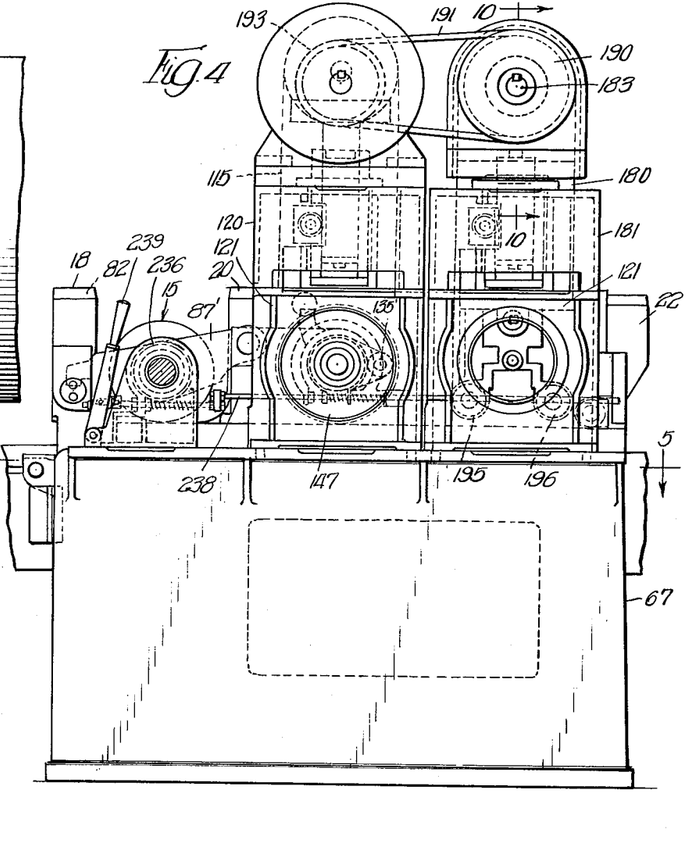
FIGURE 4 is an elevation, with portions broken away, showing the side of the machine opposite that shown in FIGURE 1.
Figure 4A:
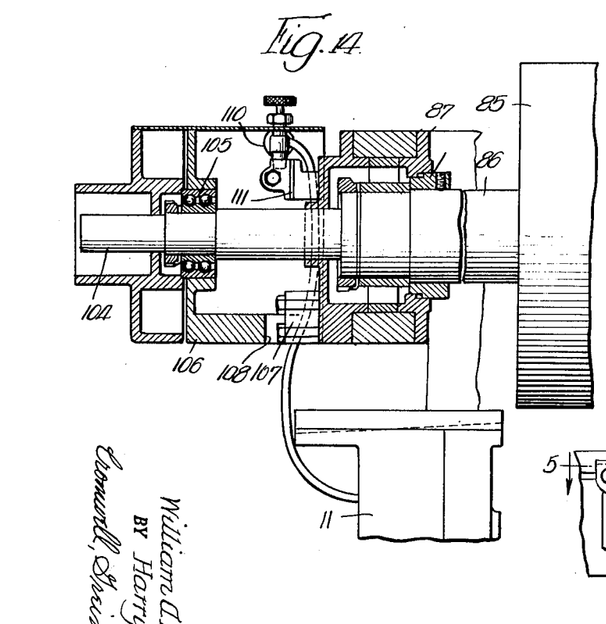
Figure 5:
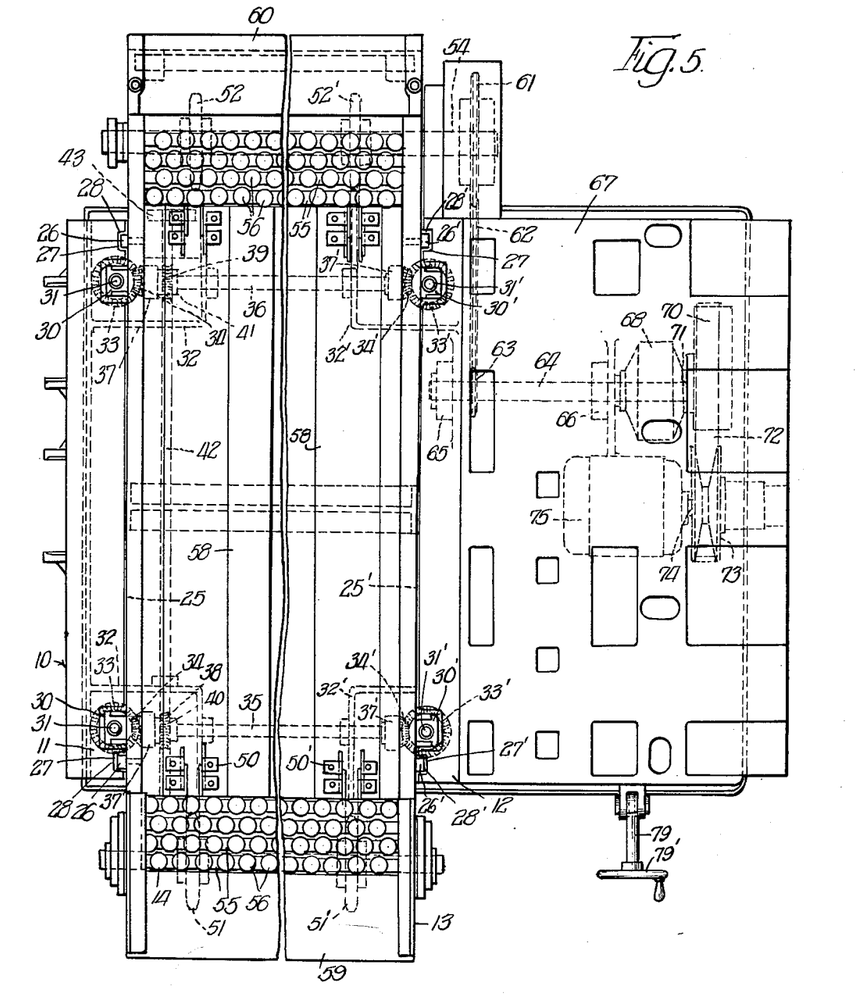
FIGURE 5 is a partial section taken on the line 5—5 of FIGURE 4, with portions omitted and with other portions broken away.

The work supporting conveyor 14 comprises a pair of laterally spaced chains 50 and 50' which are carried on end supporting sprockets 51, 51' and 52, 52'. The sprockets 51, 51' at the infeed end of the frame are carried on a cross shaft 53 while the sprockets 52, 52' at the outfeed end of the machine are carried on the cross shaft 54. The two cross shafts 53 and 54 are journaled at their opposite ends in the side plates 25 and 25' with the bearings on the shaft 53 being adjustably mounted in the plates 25 and 25' so as to adjust the tension in the chains. The chains 50 and 50' carry a series of relatively narrow, closely spaced, transversely extending bars 55, each of which is provided with a plurality of spaced pad or cup formations 56, preferably of rubber or similar material, for engaging with the work pieces as they are fed to the machine and carried beneath the sanding units. The side plates 25 and 25' are provided at their upper edges with inwardly facing recesses or ways 57 and 57' for receiving the opposite ends of the cup or pad carrying bars 55. The bars 55 are also supported intermediate their ends by a series of longitudinally extending, laterally spaced bar or plate members 58 which form ways for slidingly supporting the cross bars 55, the uppermost surfaces of the ways 58 being provided with a suitable lubricant for reducing the friction between the members.

An infeed table 59 (FIGURES 1 and 5) is provided at the receiving end of the frame 13 while an outfeed table 60 is provided at the outfeed end thereof, both tables having their upper surfaces in the plane of the work carrying surfaces of the upper run of the conveyor 14. The conveyor shaft 54 at the outfeed or discharge end of the machine has one end extended laterally for connection to a power drive for the conveyor 14. The shaft 54 carries on its extended end a sprocket 61 which is connected by the drive chain 62 with the sprocket 63 on a drive shaft 64, the latter being supported in bearing formations 65 and 66. The bearing formation 65 is provided in a vertical portion of the side frame 12 and the bearing formation 66 is carried in a side support spaced therefrom which is in the form of a housing 67 extending at the rear side of the machine and which may be cast integral with the side frame plate 12. The drive shaft 64 terminates at its outer end in a gear box 68 having the input pulley 70 on the input shaft 71 and connected by a drive belt 72 with an adjustable speed varying pulley 73 which is in turn carried on the drive shaft 74 of a motor unit 75. The motor unit 75 is supported on a bracket 76 which depends from a pivot 77 on the side frame housing 67. The bracket 76 has a tail piece 76' which carries a pivotally mounted nut 78 having threaded engagement with an adjusting shaft 79 which is rotatably supported on the frame 67 and which is provided with a handle 79' for rotating the same to adjust the tilt of the bracket 76. Operation of the motor 75, of course, drives the shaft 54 and through the latter the conveyor 14, which forms the work table and advances the work pieces beneath the sanding units 15, 16 and 17.

The first sanding unit 15 (FIGURES 1, 2, 4 11, 12, 13 and 14) is a sanding drum or roll unit which is mounted in transversely extending relation on the top of base 10 at the infeed end of the machine between the transversely extending, longitudinally spaced hollow cross beams which form the combination platen and dust collector units 18 and 20. The cross beam unit 18 is bolted or otherwise secured on the top flanges of the upright side frame members 11 and 12 and is of generally rectangular across section with the lower platen forming face 80 extended in the direction of the sanding unit 15 and having the top surface of the flange thus formed tapered downwardly in the direction of the unit 15 and provided with a transversely extending opening 81 for receiving the dust which is kicked in that direction by the unit 15. The beam 18 is provided with an upwardly opening outlet 82 on its upper face which is adapted to connect with a dust collecting conduit indicated at 83. The cross beam unit 20 which is of similar construction is arranged transversely of the machine at the other or forward side of the sanding unit 15 and the two cross beam units 18 and 20 are utilized as supports for the mounting of the sanding unit 15.

Figures 12, 13:
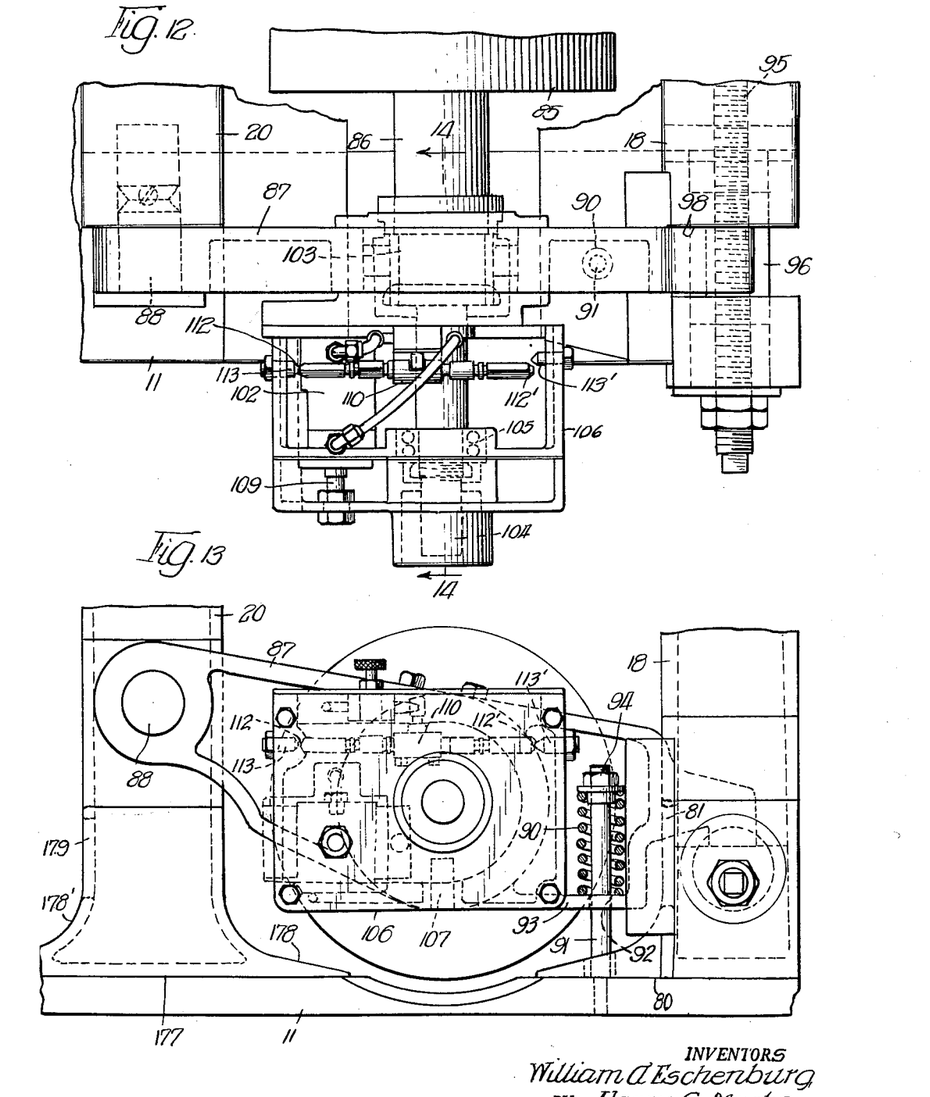
FIGURE 12 is a fragmentary plan view taken on the line 12—12 of FIGURE 1, to an enlarged scale.
FIGURE 13 is a fragmentary side elevation of the portion of the machine shown in FIGURE 12.

The sanding unit 15 comprises the roll or drum 85 (FIGURES 11 to 14) which is provided with a suitable abrasive surface material and which is of conventional construction. The drum 85 is mounted on a cross shaft 86 which extends between the end supporting side arm or frame members 87 and 87'. The side arm members 87 and 87', which are identical except for being rights and lefts, are mounted at corresponding ends on axially aligned pivots 88 and 88' extending horizontally from the end wall of the upstanding cross beam 20 so that raising and lowering of the arms 87 and 87' about the pivots 88 and 88' adjusts the height of the drum 85 and varies the depth of the cut in the surface of the material fed beneath the unit. The arm members 87 and 87' are supported at their free ends on a height adjusting mechanism incorporated in the front end cross beam 18 and each arm is restrained against upward movement by a comparison spring 90 (FIGURE 13). The spring 90 is mounted on an upstanding pin 91 which projects through a suitable aperture 92 in the bottom flange 93 of the support arm 87. The spring 90 bears against a stop nut 94 on the threaded upper end of the pin 91 and the flange 93. The height adjusting mechanism comprises a cross shaft 95 suitably journaled in the end walls of the cross beam 18 and provided at its opposite ends with right and left hand threads. A pair of identical adjusting blocks 96 are mounted for axial movement on the threaded ends of the shaft 95. The adjusting blocks 96 are slidably mounted in track forming recesses 97 in ends of the cross beam 18 which extend in the axial direction of the shaft 95. The beam 18 has upwardly opening guide slots 98 in which the ends of the roll supporting side arm members 87 and 87' are received with the lower edge of each arm bearing on the tapered upper surface 99 of the height adjusting block 96. Rotation of the adjusting shaft 95, of course, moves the blocks 96 axially of the shaft 95 toward and from each other and raises and lowers the side arm members 87 and 87' to vary the height of the drum 85.

The drum 85 is rotated by connecting the shaft 86 with a drive motor 100 (FIGURES 2 and 3) which is supported on the top of the side frame member 67 at the rear side of the machine. The end of the shaft 86 is connected to the power drive shaft of the motor 100 through a flexible connecting mechanism 101 which will permit a limited amount of misalignment so as to allow for vertical adjustment of the drum 85. The flexible connection 101 is also flexible or extensible in the axial direction so as to absorb the axial motion resulting from oscillation of the drum 85.

An oscillating mechanism is provided for the drum 85 (FIGURES 12 to 14) which comprises an hydraulic cylinder 102 mounted in fixed relation on the side arm 87 and extending parallel with the drum shaft 86. The shaft 86 is journaled in axially sliding relation in a bearing formation 103 carried in fixed relation in the arm 87 and has an extending end portion 104 of reduced cross section which is journaled in non-sliding relation in the bearing 105 mounted in the end wall of a housing 106, the latter being located outwardly of the arm 87. The housing 106 is adapted to move relative to the support arm 87 in the direction of the axis of the shaft 86 and is retained against rotative movement by a guide block 107 (FIGURE 14) secured on the support arm 87 and received in a slot 108 in the bottom wall of the housing 106. The piston 109 of the cylinder 102 is connected at its outer end to the outer wall 105 of the housing 106 so that operation of the piston 109 moves the housing 106 and the shaft 86 which is connected thereto in the axial direction of the latter. The operation of the cylinder 102 is controlled by a penumatic or hydraulic control valve 110 which is supported on a bracket 111 on the arm member 87 and provided with laterally etxending operating buttons 112 and 112'. The housing 106 carries in its oppositely disposed side walls inwardly extending pins 113 and 113' which have their axes in parallel offset relation and their inner ends projecting into the paths of the operating buttons 112 and 112' for the control valve 110 so that the piston 109 is moved first in one direction and then in the opposite direction by axial reciprocation of the housing 106 which automatically actuates the control valve 110. The drum shaft 86 moves with the housing 106 resulting in oscillation of the drum 85 through a relatively small range of movement.

The first belt sanding unit 16 (FIGURES 1, 4, 6 and 7) is arranged transversely of the machine and forwardly of the drum sanding unit 15 between the hollow cross beam units 20 and 21, the former constituting a combination platen and dust collector for cooperation with the unit. The sanding unit 16, which carries on abrasive belt 115 of substantial width, comprises a lower pressure applying or contact roll 116 and an upper belt tensioning roll 117 which are mounted at the lower and upper ends, respectively, of a cross frame having as its principal member a supporting beam 120. The supporting beam 120 extends the full width of the machine including the side frame section 67 and is supported at the one side of the machine by a box-like pedestal 121 extending upwardly of the top flange of the side frame member 12 and the adjoining portions of the top of the side frame section 67. The one end of the cross beam 120 is secured to the rear of the support section 67 by a pair of upright posts which are in the form of bolts 122 and spacer sleeves 123 so that the beam 120 extends with its major portion projecting in cantilever fashion across the work supporting conveyor 14.

The front end of the beam 120 is supported or locked in position relative to the front side frame member 11 by means of a swinging frame or lock member 125 (FIGURES 1, 3 and 6) which has the form, when in closed position, of an inverted V and which is mounted at its lower end on the side frame 11 by means of a pair of longitudinally spaced bearing forming brackets 126 and 126' which receive the ends of a pivot pin 127, the latter being carried in brackets formed at the ends of the legs of the lock member. At its upper or apex end the lock member 125 has a rotatably mounted locking bolt 128 with a knob 129 on its outer end which locking bolt 128 is adapted to engage its threaded inner end in a threaded socket 130 in a downwardly projecting end bracket 131 which is secured on the end of the cross beam 120. The locking arm 125, of course, is adapted to be swung outwardly of the machine to an open position to permit the belt 115 to be removed when belt replacement is desired.

Figure 6:
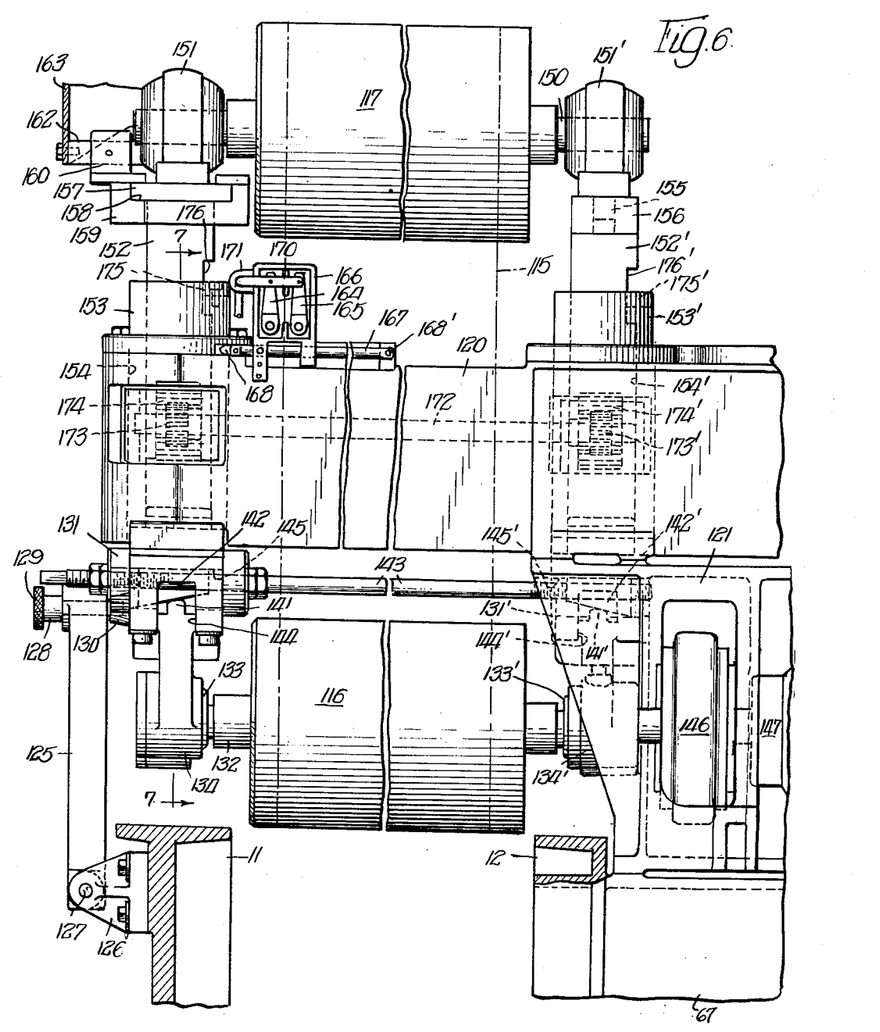
FIGURE 6 is a partial vertical cross section taken on the line 6—6 of FIGURE 1, to an enlarged scale and with portions broken away.
Figure 7:
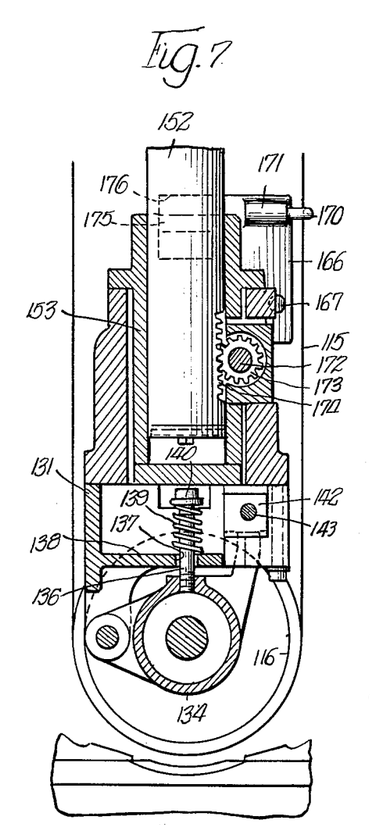
FIGURE 7 is a partial vertical section taken on the line 7—7 of FIGURE 6.

The lower contact or pressure roll 116 (FIGURES 1, 4, 6 and 7) has the ends of its supporting shaft 132 journaled in bearings 133 and 133' in swingably mounted, transversely spaced support arms 134 and 134'. The support arms 134 and 134' are attached at one end by pivots 135 and 135' to the depending brackets 131 and 131' which are secured on the bottom of the cross beam 120. The pivots 135 and 135' have their axis aligned transversely of the machine so that the arm members 134 and 134' form a swinging frame for the roll 116. The support arms 134 and 134' extend in a generally horizontal direction and each arm, as shown in FIGURE 7, carries intermediate its ends an upstanding pin or bolt 136 which projects through an aperture 137 in the bottom of pocket 138 in the bracket 131 and through compression spring 139. Adjustable end stop nut 140 is provided on the top end of the bolt 136 against which the spring 139 engages so as to normally urge the roll support arms in an upper direction away from the work supporting bed of the machine. Height adjusting mechanism is provided which engages with upwardly extending end portions 141 and 141' on the roll support arms 134 and 134' and moves the arms against the force of the springs 139 so as to adjust the height of the roll 116.

The upper edges or faces of the arm extensions 141 and 141' engage the beveled surfaces of a pair of wedge-shaped block members 142 and 142' which are carried on the right and left hand threaded ends of an adjusting cross shaft 143, the latter being journaled at its opposite ends in portions of the downwardly extending brackets 131 and 131' on the cross beam 120 and having one end extended and squared to receive an operating handle or wheel (not shown). The depending bracket formations 131 and 131' at the ends of the cross beam 120 are slotted at 144 and 144' in the direction transversely of the beam 120 to receive the arm extensions 141 and 141' and recessed in the direction longitudinally of the beam to provide guideways 145 and 145' for the adjusting blocks or wedges 142 and 142'. The contact roll 116 may be rubber covered with spiral grooves or it may have any other surface suitable for receiving the belt 115 and applying pressure through the belt as the work passes beneath the unit. The roll shaft 132 is extended at the rear side of the machine and is connected by the flexible connection 146 with the power shaft of a drive motor 147 so that roll 116 is driven in the same manner as the drum 85 of the drum unit 15.

The upper belt tensioning roll 117 (FIGURES 1, 6 and 7) has the opposite ends of its supporting shaft 150 mounted in bearing carrying bracket members 151 and 151'. The bearing brackets 151 and 151' are supported on the upper ends of vertically disposed pistons 152 and 152' which extend upwardly of hydraulic cylinders 153 and 153', the latter being mounted in vertically extending recesses 154 and 154' in the cross beam 120. At the rear side of the machine the bearing bracket 151' is secured by a vertical pin 155 to a base plate 156, which is in turn secured on the upper end of the vertically disposed piston 152'. The bearing in the bracket 151' is self-aligning and will permit the roll 116 to swing a limited amount in a horizontal plane about the vertical axis of its support. At the front side of the machine the bearing bracket 151 is mounted on a slide plate 157 which is received in longitudinally sliding relation in a guide track 158 in the base plate 159 which is secured on the upper end of the vertically disposed piston 152 so that the end of the roll can be moved in a longitudinal path relative to its support. Movement of the slide plate 157 in the track 158 is controlled by a pneumatic or hydraulic cylinder 160 which is mounted in fixed relation on the base plate 159 and which has its piston 161 secured by a flexible connection to a transversely extending bracket forming bar 162, the latter being secured on the bearing block 151 and forming one of a pair of like bracket bars 162 and 162' for supporting an end cover or belt guide member 163.

The cylinder 160 (FIGURES 1, 6 and 7) is controlled by an electromagnetic valve which is in turn under the control of a pair of air operated switches 164 and 165. The switches 164 and 165 are supported in a housing 166 which is slidably mounted for adjustment traversely of the machine on a bar support 167 having its ends secured at 168 and 168' on the cross beam 120. The switches 164 and 165 are arranged in transversely spaced side-by-side relation with their operating fingers disposed opposite spaced apertures in an air control tube 170 which extends in a transverse direction across the open face of the housing 166 and in outwardly spaced relation to the same, the control tube 170 being secured by the bracket 171 to the housing 166 and being connected to a compressed air supply (not shown). The housing 166 is adjusted on the bar 167 so that the edge of the sanding belt 115, when the belt is tracking properly, moves in a path which is between the two switches 164 and 165 with the outer switch 164 being held closed by the unobstructed air stream from the tube 170 and the inner switch 165 being held open due to the blocking of the air stream from the tube 170 by the interposed margin of the sanding belt 115. As long as the belt is tracking properly on the rolls 116 and 117, there is no swinging movement of the top roll 117. When the belt 115 moves too far to the right, as viewed in FIGURE 6, the switch 165 is operated by the uncovered air stream from the tube 170 and the cylinder 160 is actuated to swing the roll 117 in the proper direction to cause the belt to move to the left on the roll 117. This movement is stopped when the belt moves sufficiently to bring the edge between the two switches 164 and 165 thereby cutting off the air stream to the switch 165. If the belt moves too far to the left, as viewed in FIGURE 6, so as to cause the margin of the belt to cover the air stream actuating the switch 164, the latter opens which operates the cylinder 160 to move the roll 117 in the opposite direction thereby causing the belt 115 to move to the right until the edge reaches its proper path which uncovers the air stream operating switch 164 and stops the swinging movement of the roll 117. This arrangement automatically holds the belt in proper tracking relation on its supporting rolls with connections being made in its path of travel in response to transverse movement of the belt.

The cylinders 153 and 153' (FIGURES 6 and 7) are connected to the pneumatic or hydraulic system to provide for vertical movement of the pistons 152 and 152' with the movement being equalized by a shift 172 which is journaled in the supporting beam 120 and carries at its opposite ends pinions 173 and 173' which extend through slots in the cylinders 153 and 153' and engage with rack formations 174 and 174' provided on the pistons 152 and 152'. The movement of the pistons 152 and 152' is limited by stop members 175 and 175' which engage in slots 176 and 176' cut in the pistons 152 and 152'. The pistons 152 and 152', of course, are urged upwardly to provide tension in the belt 115 through the tensioning roll 117 while the unit is in operation, the tension being relieved when the belt is removed from the unit.

The hollow cross beam and dust collector member 20 (FIGURES 1, 2 and 13) has its lower platen forming face 177 extended on opposite sides to form flanges 178 and 178' with the top surfaces of the latter tapered and extending to adjacent the operating surface of the roll 116 on the belt unit 16, and the surface of the drum 85 on the drum unit 15, respectively. Both the drum 85 and the belt 115 are normally driven in a direction opposite to the direction of advancing movement of the work and a transversely extending slot or opening 179 is provided in the wall of the cross beam 20 through which the dust from the belt 115 is received. The cross beam member 20 has an outlet in its upper face and a connecting conduit (not shown) for removing the dust from the machine.

Figure 2:
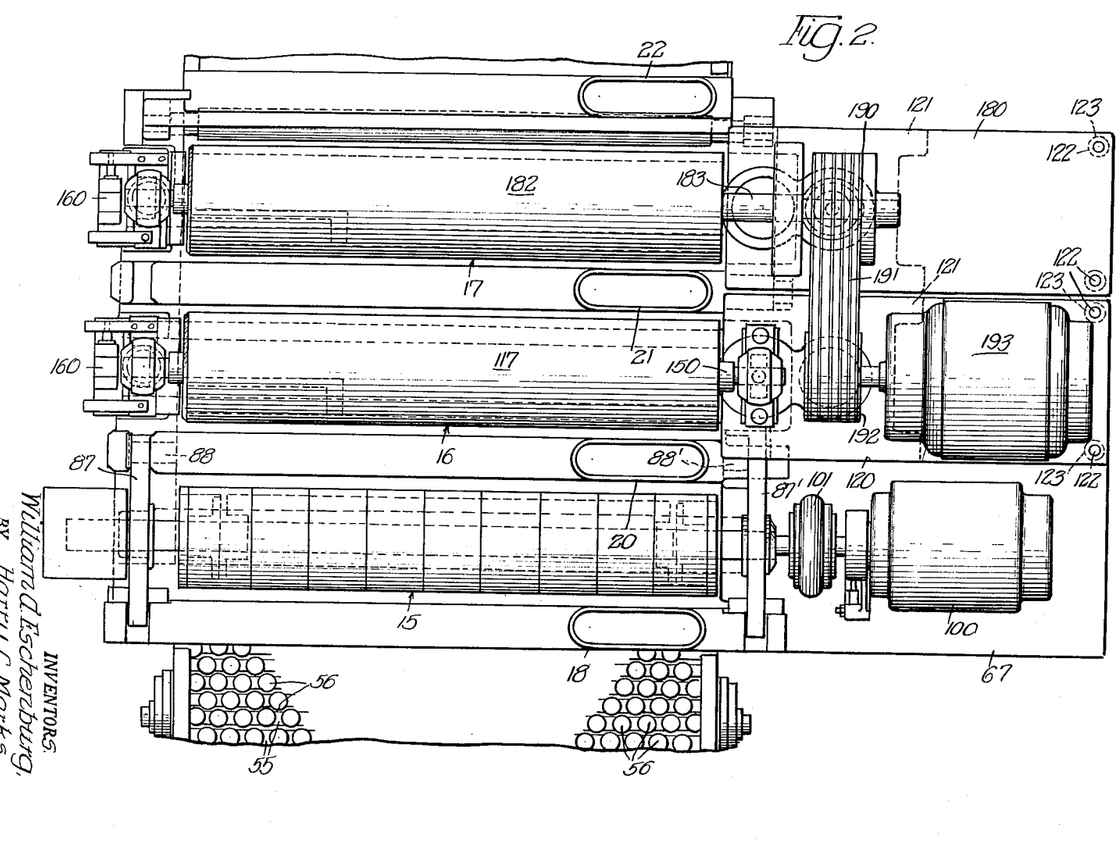
FIGURE 2 is a plan view of the machine, with portions thereof omitted, or broken away.
Figure 10:
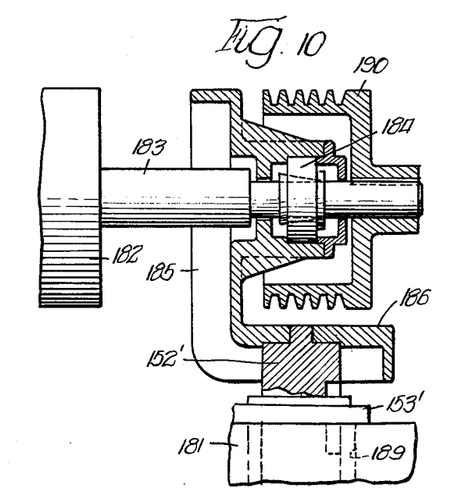
FIGURE 10 is a fragmentary section taken on the line 10—10 of FIGURE 4, to an enlarged scale.
Figure 11:
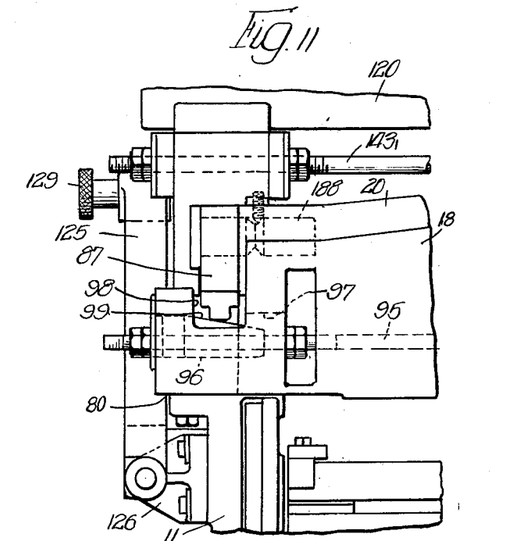
FIGURE 11 is a fragmentary end elevation taken on line 11—11 of FIGURE 1, to an enlarged scale.

The second belt unit 17 is arranged in forwardly spaced relation relative to the belt unit 16 and the two belt units are separated by the platen forming cross beam and dust collector unit 21. The construction of the belt unit 17 is similar to the belt unit 16 and where like parts are employed they will be referred to by the same numerals. The belt 180 of the unit 17 is supported on a cross frame which includes a cantilever type cross beam 181 which is of the same length and similar in construction to the cross beam 120 of the unit 16. The cross beam 181 is supported on a pedestal 121 at the rear side of the machine which is in turn supported on the top surface of the side frame plate 12 and the side frame housing 67, with the rear end of the beam 181 being secured by bolts and spacer sleeves to the outer edge of the housing 67 in the same manner as cross beam 120. A belt supporting and tensioning roll 182 is supported at the top of the unit, the roll 182 having a shaft 183 which has a somewhat greater length than the corresponding shaft 150 of the belt unit 16. The shaft 183 is supported at the front side of the machine (the left end of the roll as viewed in FIGURES 3 and 10) on the upper end of the piston 152 and has an oscillating mechanism which is identical with that provided for the belt tensioning roll 117 in the unit 16. At the rear side of the machine, the shaft 183 is supported in a bearing 184 which is mounted in the vertical leg of an L-shaped supporting bracket 185. The lower horizontal leg 186 of the bracket 185 is mounted on the end of the vertical piston 152'. The bearing 184 is self-aligning so as to permit the end of the shaft 183 to turn about a vertical axis coinciding with the vertical axis of the supporting piston 152'. The piston 152' extends from the cylinder 153' which is mounted in a vertical recess 189 in the cross beam 181. The recess 189 is identical with the recess 154' in beam 120 except that it is located at a point closer to the end of the beam. In practice, the beams 180 and 120 may be made identical with both recesses 154' and 189 being provided, as indicated in FIGURE 2, so that the beams may be used interchangeably in the units 16 and 17. The roll shaft 183 carries on its outer end a sheave 190 which is connected by a multiple section drive belt 191 with the output pulley 192 on a drive motor 193, the latter being mounted on the rear end of the cross beam 120. The axis of the pivot pin 188 lies in a vertical plane in the center of the drive belt 191 so that the slight oscillation or rotational movement in the horizontal plane which is imparted to the roll 182 in maintaining the belt 180 in proper tracking relation thereon does not materially affect the drive connection to the motor 193.

The belt 180 on the unit 17 is carried at the lower end of the supporting frame on a pair of guide rollers 195 and 196 (FIGURES 1 and 8) which are journaled at opposite ends in spaced pairs of bearings at the bottom of the bracket members 197 and 197', the latter depending from the cross beam 181. The bracket member 197 at the front side of the machine is provided with an outwardly extending boss having a threaded socket 198 for receiving the locking bolt 128 of an end locking member 125 for the belt unit 16.

A transversely extending shoe assembly 200 (FIGURES 1, 8 and 9) is carried on the bracket members 197 and 197' between the guide rollers 195 and 196 at the bottom of the belt unit 17 which has a curved lower surface over which the belt 180 is adapted to travel and be resiliently pressed against the surfaces of work pieces carried beneath the unit. The shoe or pad assembly 200 comprises a fabric covered pressure pad 201 which is mounted on the lower face of a supporting plate 202. The pad plate 202 is attached to a bar member 203 which is clamped in locked relation to a support bar member 204. The bar member 203 is provided in its top face with an upwardly opening longitudinally extending guideway forming recess 205 of inverted T-shaped cross section and the support member 204 is provided in its bottom face with a downwardly opening, longitudinally extending recess 206 of rectangular cross section on the open face of which a lock plate 207 is secured. The bar 203 is suspended on spaced locking clamp members 208 which have a cylindrical bottom stem and head portion 209 slidably received in the guideway 205 of the bar member 203 and a top cross bar portion 210 which is positioned to extend lengthwise in the recess 206 of the support bar 204 and which is held therein by the lock plate 207, the latter being apertured to allow the head and stem portions 209 of the locking clamp members 208 to pass therethrough. The bar portions 210 are provided on opposite ends with V-shaped recesses 211 which are adapted to receive the conical ends of relatively long intermediate lock bars 212 and relatively short end lock bars 213 which lock bars are also positioned in the recess 206 in the support bar 204. The cross bar portions 210 of the locking clamp members 208 are urged in the downward direction by springs 214 which are seated in sockets 215 in the support member 204. Axially extending screws 216 and 216' are mounted in threaded engagement in apertures provided in the ends of the support bar 204 with their inner ends bearing on the ends of the outermost lock bars 213 so that by taking up on the screws 215 and 215' the shoe member 203 is locked to the bar 204 with uniform downward pressure exerted by the engagement of the conical ends of the lock bars or rods 212 and 213 in the recesses 211 of the hanger or locking clamp members 208.

Figures 8, 9:
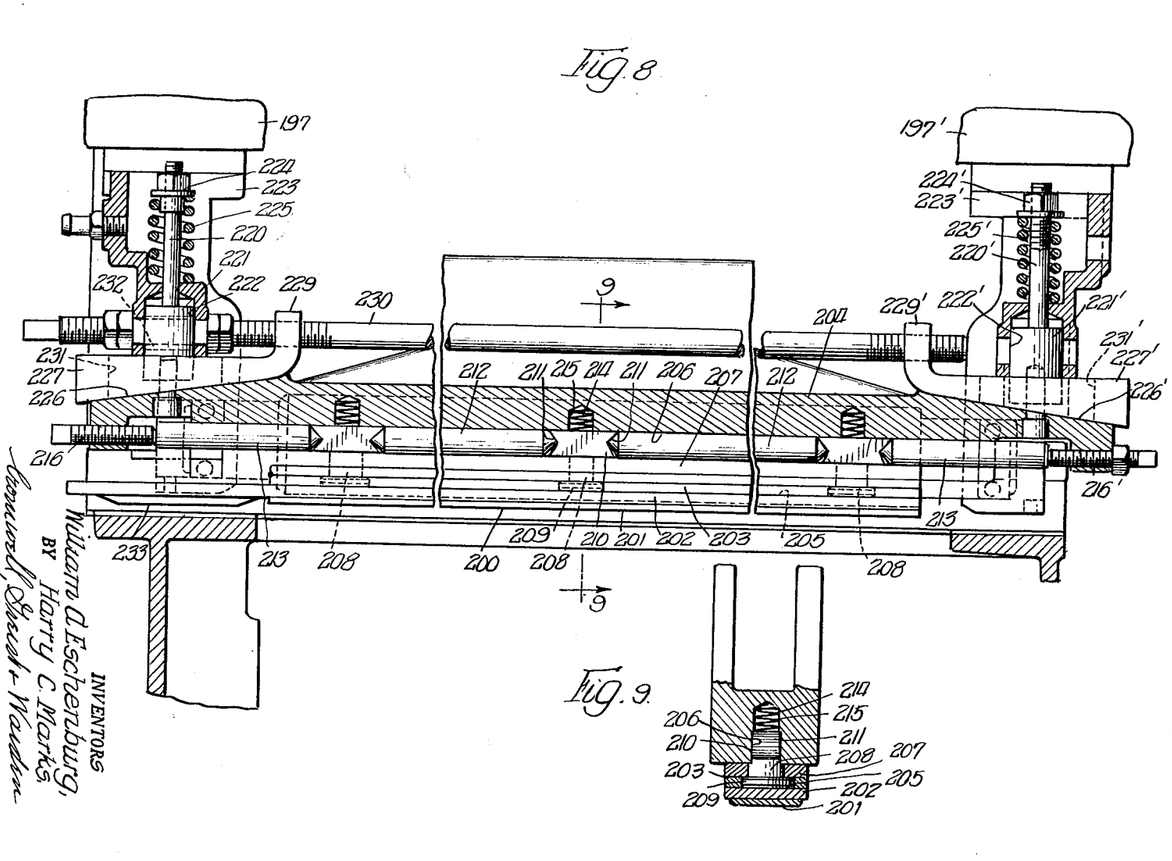
FIGURE 8 is a partial vertical section taken on the line 8—8 of FIGURE 1 to an enlarged scale, and with portions broken away.
FIGURE 9 is a cross section taken taken on the line 9—9 of FIGURE 8.

The shoe support bar member 204 is bolted at its opposite ends to upstanding hanger pins or studs 220 and 220' which have bottom portions 221 and 221' of enlarged cross section slidably received in vertically disposed cylindrical recesses 222 and 222' in the end hanger brackets 223 and 223' which depend from the bracket members 197 and 197'. The hanger pins 220 and 220' extend upwardly through apertures in horizontal web portions of the hangers 223 and 223' and are provided with stop nuts 224 and 224' on the threaded ends thereof against which the upper ends of the compression springs 225 and 225' engage, the latter engaging at their lower ends with the web portions of the hangers 223 and 223' so as to urge the support bar 204 in the upward direction. The support bar 204 is provided at its opposite ends with upwardly facing tapered abutment surfaces 226 and 226' which are in planes converging inwardly of the ends of support bar 204 and which are engaged by complementary tapered faces on the bottom of adjusting wedges 227 and 227'. The wedges 227 and 227' have horizontal upper faces which are in sliding engagement with the abutment surfaces 228 and 228' on the bottom of the hanger brackets 223 and 223'. The wedges 227 and 227' have upwardly directed flanges 229 and 229' at their inner ends which are apertured so as to receive in threaded engagement the threaded ends of a horizontally disposed adjusting rod or shaft 230. The wedges 227 and 227' also have elongate vertical slots 231 and 231' for accommodating the hanger studs 220 and 220' so as to permit horizontal movement of the wedges and vertical movement of the support bar 204. The adjusting rod or shaft 230 has one end extended and rotatably supported in bearing apertures in the front hanger bracket 223 with the end shaped to receive a turning tool. The hanger stud 220 is apertured or slotted at 232 to accommodate the adjusting rod 230 and permit vertical movement of the stud 220 without interference from the rod 230. With this arrangement, rotation of the adjusting rod 230 moves the wedges 227 and 227' horizontally and adjusts the vertical position of the support 204 relative to the end support brackets 197 and 197' against the pressure exerted by the springs 225 and 225'.

The belt unit 17 is provided with a belt tracking control arrangement of the same construction as the unit 16 which swings the roll 182 about its pivot 188 in response to movements of the belt 180. Except as described herewith the unit 17 has the same structure and operation as the belt unit 16.

The combination cross beam platen and dust collector member 21 (FIGURE 1) which is located between the belt units 16 and 17 is of the same construction as the member 20 and is apertured at 233 to receive the dust from the belt 180.

A final hold down roller 234 is supported at the discharge end of the machine in end bearings 235 which are mounted on the cross beam member 22 which forms the end dust collecting chute. The cross beam 22 is hollow and provided with bottom openings for picking up the dust from the work as it emerges from the final finishing operation on the conveyor 14. An outlet is provided in the top wall of the cross beam 22 with a suitable conduit connection to the conduits from the dust collecting cross beams 18, 20 and 21 and with suction provided sufficient to draw the dust from all the units and discharge it into a collecting system.

Preferably, the drive shafts of motors 100 and 147 are provided with suitable brake mechanisms, as indicated at 236 and 237 (FIGURE 4) which are connected by a linkage 238 with an operating handle 239 pivotally mounted on the side frame 67 at the front of the machine so as to enable the operator to quickly stop the rotation of the drum 85 and the roll 116 when operation of the units 15 and 16 is stopped by shutting off the current to the motors 100 and 147.

In operating the machine of FIGURES 1 to 14, the bed frame 13 is adjusted to the height desired and the proper adjustment is made of the drum unit 15, the lower pressure roller 116 on the belt unit 16 and the shoe 200 on the belt unit 17 so that the upper surface of the work will be engaged by the successive units as the work is advanced through the machine by the conveyor 14. Each of the sanding units is adjusted so that resilient pressure is applied to the abrasive while it is in contact with the surface of the work pieces which are carried through the machine on the conveyor 14. The work to be sanded is, of course, fed through the machine on the top or work supporting run of the conveyor 14, the latter being set at the proper height for the thickness of material being fed and its speed being adjusted to provide the cutting and polishing desired. The drum 85 and the belts 115 and 180 preferably are operated in a direction opposite to the direction of travel of the work on the conveyor 14.

The platen forming bottom surfaces of the cross beams 18, 20 and 21 serve to hold the work on the conveyor 14 and limit the upper movement of the same as it approaches the sanding units.

Figure 15:
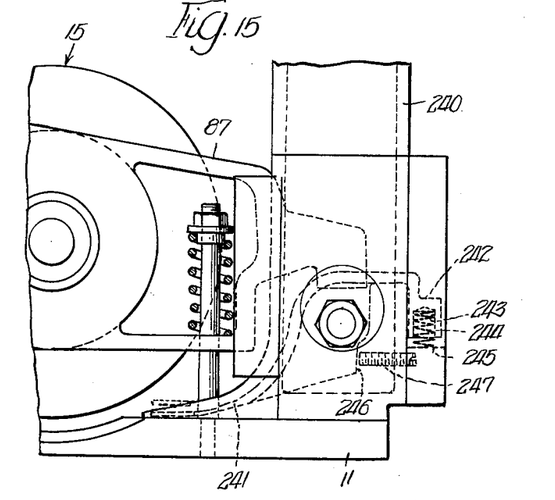
FIGURE 15 is a fragmentary side elevation showing a modification.
Figure 16:
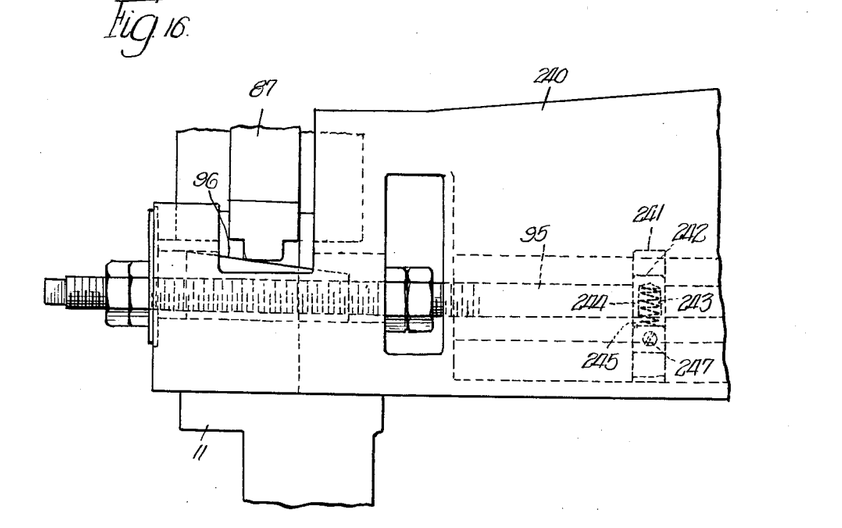
FIGURE 16 is a fragmentary end elevation showing the modification of FIGURE 15.

In the modification shown in FIGURES 15 and 16 the combination cross beam and dust chute 240 at the entrance end of the machine is provided with a plurality of spaced hold down fingers or shoes 241 which are carried on the adjusting shaft 95. Each hold down finger or shoe 241 is pivoted on the shaft 95 and has a tail piece 242 which is provided with a downwardly opening recess 243 in which a compression spring 244 is seated. The lower end of the spring 244 rests on a ledge 245 in the beam 240 and the spring 244 urges the shoe 241 in a counterclockwise direction as viewed in FIGURE 15. An abutment surface 246 is provided on the shoe 241 which engages with an adjustable stop pin 247 to limit the movement in the direction of the conveyor 14. The shoes 241 are normally held out of engagement with the conveyor when no work is carried on the latter and resiliently engage the work pieces when they are carried on the conveyor beneath the cross beam 240.

The sanding units 15, 16 and 17 are interchangeable on the supporting frame 11 so that different drum and belt unit combinations may be set up, if desired, with only slight changes in the supports for the drive motors being required. This enables the user to adapt the machine for finishing different materials where a different sequence of finishing operations may be advantageous.

The machine as illustrated in the drawing employs a traveling belt conveyor on which the work is supported or fed through the machine but the machine could be designed to employ a roll feed for the work.

While particular materials and specific details of construction have been referred to in describing the machine illustrated, it will be understood that other materials and different structural details may be resorted to within the spirit of the invention.

We claim:

1. In a sanding machine, a supporting frame, a conveyor having a work supporting horizontal run mounted on said frame, and a sanding belt unit mounted on said frame above said horizontal conveyor run, which sanding belt unit comprises a vertically disposed cross frame extending over said horizontal conveyor run, a supporting bracket on one side of said conveyor to which said cross frame is attached, a belt supporting work contacting roll at the bottom end of said cross frame and extending transversely of said work supporting conveyor run, bearing members for said contacting roll at opposite sides of said frame, generally horizontal, longitudinally extending bracket members for said bearing members, which bracket members are pivoted on said frame on transversely aligned horizontal axes, means for swinging said bracket members to raise and lower said work contacting roll whereby to adjust the vertical position of said contacting roll relative to the work supporting conveyor run, a belt tensioning roll at the upper end of said cross frame and extending generally parallel with said work contacting roll, bearing members for said belt tensioning roll at opposite sides of said frame, a vertical pivot mounting for one of said last mentioned bearing members, the other one of said bearing members having a horizontal slide thereon, a horizontal track on said cross frame which track extends longitudinally of the machine and receives said bearing slide, a pneumatic cylinder mounted on said cross frame and having its piston connected to the slide carrying member for moving the same relative to the cross frame so as to maintain proper tracking of a sanding belt mounted on said upper and lower belt supporting rolls, and control means for said cylinder mounted on said cross frame adjacent the path of the side edge of the sanding belt which control means is operated in response to movements of the belt in the direction of the axis of rotation of the belt tensioning roll.

2. In a belt type sanding machine wherein a traveling belt is mounted in vertically disposed relation above a work vertically disposed, transversely extending supporting table, a supporting frame, a belt carrying and work contacting roll journaled in end supports which depend at the lower end of said supporting frame, a belt carrying and tensioning roll journaled at opposite ends in bearings at the upper end of said supporting frame, vertically disposed fluid operated cylinders at opposite ends of said supporting frame having pistons on which said bearings are journaled, a transversely extending shaft mounted in said supporting frame, pinions on opposite ends of said shaft, and vertically disposed rack formations on said pistons engaging said pinions whereby vertical movement of said bearings is equalized.

3. In a belt sander, a supporting frame, a traveling conveyor mounted on said frame for supporting and advancing work pieces in a horizontal plane, and a belt sanding unit mounted on said frame and extending transversely of the path of said work pieces, said belt sanding unit comprising an upright cross frame, an upper belt supporting and tensioning roll journaled in end bearings on said cross frame, means for adjusting the vertical position of said end bearings, a pair of parallel spaced lower guide rolls each journaled in bearing members on said cross frame, said guide rolls being positioned adjacent the path of said work pieces and in vertically spaced relation to said belt supporting and tensioning roll, a transversely extending platen member disposed between said belt guide rolls, hanger rods slidably mounted in said cross frame and connected at their lower ends to opposite ends of said platen, spring means urging said hanger rods upwardly, wedge means for adjusting the height of said platen, said platen having a belt engaging pad and means including a mounting plate and spring pressed clamping members to mount said pad on said platen so as to equalize the pressure of the pad against the belt.

4. In a sanding machine, an upright supporting frame, a conveyor mounted on said supporting frame with a work supporting upper run thereof extending horizontally, and a sanding belt unit positioned above said horizontal conveyor run, said sanding belt unit comprising a transversely disposed frame member extending over said horizontal conveyor run, a side frame forming a supporting bracket on one side of said upright supporting frame to which said frame member is attached so that said transversely disposed frame member extends in the form of a cantilever beam across said supporting frame, a belt supporting work contacting roll having its ends journaled in bearing brackets depending from said cantilever beam, means for adjusting the position of said bearing brackets whereby to adjust the position of said work contacting roller relative to the work supporting conveyor run, a belt tensioning roll mounted on a shaft having its ends journaled in bearing members extending above said cantilever beam, one of said bearing members being connected to said cantilever beam for movement about a vertically extending pivot axis, the other one of said bearing members having a horizontal sliding connection with said cantilever beam, a drive motor mounted on said side frame and having a power output shaft with a drive member thereon, a drive member on the tensioning roll shaft and an endless drive member extending between said motor and shaft drive members with the drive members operating in a vertical plane in which said pivot axis lies.

5. A material working machine comprising an upright main supporting frame and a laterally extending side frame, a continuously traveling work supporting conveyor mounted on said main supporting frame and having a horizontally disposed upper run on which the work is adapted to be advanced, a sanding drum mounted on a transversely extending shaft having its ends supported on said main supporting frame above the infeed end of the work supporting conveyor, a first belt sanding unit mounted above the upper run of said conveyor adjacent said sanding drum which belt sanding unit has vertically spaced belt supporting rolls and a continuously traveling sanding belt carried thereon, the lower one of said rolls being mounted on a transversely extending shaft, a second belt sanding unit mounted above the upper run of said conveyor adjacent said first belt sanding unit which second belt sanding unit has vertically spaced belt supports and a continuously traveling sanding belt carried thereon, the upper belt support comprising a roll mounted on a transversely extending shaft, a drive motor mounted on said side frame and having a flexible connection with one end of the sanding drum shaft, a drive motor mounted on said side frame and having a flexible connection with one end of the lower roll shaft of the first belt sanding unit, and a drive motor mounted on said side frame and having a belt and pulley connection with the upper roll shaft of said second belt sanding unit.

6. A sanding machine comprising an upright supporting frame, a traveling work supporting conveyor mounted on said supporting frame and having a horizontally disposed upper run on which the work is adapted to be advanced, a drum sanding unit positioned in transversely extending relation above the infeed end of the work supporting conveyor, a pair of hollow cross beams forming dust collecting units mounted on said frame on opposite sides of said drum sanding unit, drum supporting bracket arms pivoted to one of said cross beams, and means on the other one of said cross beams for adjustably securing the free ends of said bracket arms so as to adjust the vertical position of the sanding drum.

7. In a belt type sanding machine having a work supporting table and a traveling belt unit mounted in vertically disposed transversely extending relation above said work table, a supporting frame which is characterized by an elongate beam having one end mounted on a bracket at one side of the work table, the other end of said beam being free and extending in cantilever forming relation across the work table, a lower belt carrying and work contacting roll journaled in transversely spaced end supports which depend at the lower side of said beam, an upper belt carrying and tensioning roll journaled at opposite ends in transversely spaced bearings positioned on the upper side of said beam, transversely spaced, vertically movable means on said beam for supporting said bearings, said bearing supporting means being operable to urge said tensioning roll upwardly, and a locking and bracing member swingably mounted at one end adjacent the side of the work table and having means at its free end to secure the same to the free end of said beam when it is swung upwardly against the free end of said beam.

8. In a belt type sanding machine as recited in claim 7 and said locking and bracing member comprising a frame having an inverted V-shaped portion with its legs pivotally mounted on the side of the work table, said locking frame being swingable or a horizontal axis to a vertically disposed locking position and having a lock member at its apex which is engageable with a cooperating lock member on the free end of said cantilever beam.

9. A work finishing machine comprising a supporting frame having work advancing means thereon, a drum having an abrasive surface positioned in transversely extending relation above said work advancing means, bearing members at the end of the drum for rotatably supporting the drum, lever forming arm members extending in generally horizontal relation at opposite ends of the drum on which said bearing members are mounted intermediate the ends thereof, said arm members being pivoted at one end for rotative movement in parallel vertical paths about an axis extending transversely above said work advancing means, an adjusting shaft rotatably mounted in transversely extending relation adjacent said drum with its axis parallel with the pivot axis of said arm members, and adjusting members on opposite ends of said adjusting shaft, said adjusting members having abutment surfaces positioned to engage beneath the free ends of said arm members and constructed so as to raise and lower said arm members and said drum in response to rotation of said adjusting shaft.

10. A work finishing machine comprising a supporting frame having means thereon for advancing work pieces along a horizontal path and a drum sanding unit having an abrasive surface positioned on said frame in transversely extending relation above said work advancing means, bearing members at the end of the drum for rotatably supporting the drum, lever forming arm members extending in generally horizontal relation at opposite ends of the drum on which said bearing members are mounted intermediate the ends thereof, said arm members being pivoted at one end for rotative movement in transversely spaced parallel vertical paths about an axis extending transversely above the path of the work, an adjusting shaft rotatably mounted in transversely extending relation adjacent said drum with its axis parallel with the pivot axis of said arm members, and adjusting members having threaded connection with opposite ends of said adjusting shaft so as to travel in the axial direction thereon when said adjusting shaft is rotated, said arm members having free ends extending adjacent the ends of said adjusting shaft, said block members being positioned to engage beneath the free ends of said arm members and being constructed to raise and lower said drum in response to rotation of said adjusting shaft.

11. A work finishing machine comprising a supporting frame, a conveyor mounted on said frame and having a horizontal run on which the work is advanced, a drum having an abrasive surface positioned in transversely extending relation above said work supporting conveyor run, bearing members at opposite ends of the drum for rotatably supporting the drum, lever forming arm members at opposite ends of the drum on which said bearing members are mounted intermediate the ends thereof, said arm members being pivoted at one end on said frame for rotative movement in parallel vertical paths about a common transversely extending axis at one side of the drum, an adjusting shaft rotatably mounted in transversely extending relation at the other side of said drum with its axis parallel with the pivot axis of said arm members, and adjusting block members having threaded connection with opposite ends of said adjusting shaft so as to travel in the axial direction thereon when said adjusting shaft is rotated, said arm members having free ends extending above the opposite ends of said adjusting shaft and said block members having beveled abutment surfaces positioned to engage beneath the free ends of said arm members so as to raise and lower said drum in response to rotation of said adjusting shaft.

12. A work finishing machine comprising a supporting frame, a conveyor mounted on said frame and having a horizontal run on which the work is advanced, a drum having an abrasive surface positioned in transversely extending relation above said work supporting conveyor run, bearing members at the end of the drum for rotatably supporting the drum, lever forming arm members at opposite ends of the drum on which said bearing members are mounted intermediate the ends thereof, said arm members being pivoted at one end to said frame for rotative movement in parallel vertical paths about a common transverse axis which is at one side of the drum, an adjusting shaft rotatably mounted on said frame in transversely extending relation at the opposite side of said drum with its axis parallel with the pivot axis of said arm members, said adjusting shaft having oppositely threaded ends, adjusting members having threaded connection with the opposite ends of said shaft so as to travel in the axial direction thereon when said shaft is rotated, said adjutsing members having beveled abutment surfaces extending in diverging planes and positioned to engage beneath the free ends of said arm members so as to raise and lower said drum in response to rotation of said adjusting shaft, and resilient means connecting the free ends of said arm members with the frame so as to normally urge the drum toward a lowered position.

13. In a sanding machine, an upright supporting frame, a traveling work supporting means on said frame, a sanding unit mounted on said frame above said work support means for engaging the uppermost surface of work pieces carried on said work supporting means, a hollow cross beam forming a platen and dust collecting member mounted on said frame adjacent said sanding unit at the entrance end of said work-supporting means, and a series of work engaging shoes rotatably mounted on said beam and resiliently urged in the direction of said work supporting means for holding the work pieces thereon.

14. In a belt sander, a supporting frame, a traveling conveyor having a work supporting run mounted on said frame, and a vertically disposed, transversely extending belt sanding unit mounted on said frame above said work supporting conveyor run, said belt sanding unit comprising a cross frame, an upper belt supporting roll journaled in end bearings at the upper end of said cross frame and extending transversely of said work supporting conveyor run, means for adjusting the vertical position of said end bearings, a pair of longitudinally spaced, transversely extending lower guide rolls journaled in bearing members at the bottom of said cross frame, and a transversely extending platen member disposed between said belt guide rolls, said platen member comprising an elongate belt engaging resilient pressure pad extending across the work supporting run of the conveyor, a mounting plate secured for vertical adjustment on said cross frame, a series of spring pressed clamp members connecting said pressure pad to said mounting plate and means connecting said clamp members so as to provide equal pressure along the length of said pad.

15. A material working machine comprising an upright supporting frame, a traveling work supporting conveyor mounted on said supporting frame and having a horizontally disposed upper run on which the work is adapted to be advanced, a drum sanding unit mounted on said supporting frame in transversely extending relation above the infeed end of the work supporting conveyor, a first belt sanding unit mounted in upright transversely extending relation on said supporting frame adjacent said drum sanding unit which belt sanding unit has parallel, vertically spaced transversely extending belt supporting roll members and a traveling sanding belt carried thereon, and a second belt sanding unit mounted in upright, transversely extending relation on said supporting frame adjacent said first belt sanding unit which second belt sanding unit has parallel vertically spaced transversely extending belt supporting members and a traveling sanding belt carried thereon, the upper belt supporting member of said second belt sanding unit comprising a vertically adjustable tensioning roll and the lower belt supporting member comprising a transversely extending work contacting platen, said drum sanding unit and said first and second belt sanding units being interchangeably mounted on said supporting frame.

16. A material working machine comprising an upright supporting frame, a continuously traveling work supporting conveyor mounted on said supporting frame and having a horizontally disposed upper run on which the work is adapted to be advanced, a drum sanding unit mounted on said supporting frame in transversely extending relation above the infeed end of the work supporting conveyor, a vertically disposed belt sanding unit mounted on said supporting frame and extending transversely above the upper run of said work supporting conveyor adjacent said drum sanding unit which belt sanding unit comprises a pair of parallel, transversely extending, vertically spaced belt supporting rolls and a continuously traveling sanding belt carried thereon, and a second vertically disposed belt sanding unit mounted on said supporting frame above the upper run of said work supporting conveyor and adjacent said first belt sanding unit which second belt sanding unit comprises vertically spaced, transversely extending upper and lower belt supports and a continuously traveling sanding belt carried thereon, the upper belt support of said second belt sanding unit comprising a belt tensioning roll which is mounted for vertical adjustment and the lower belt support of said unit comprising a pair of parallel, transversely extending, longitudinally spaced belt guide rolls and a transversely extending work contacting platen mounted between said guide rolls with the lower face thereof below said guide rolls, and said first and second belt sanding units being interchangeably mounted on said supporting frame.

17. A material working machine as recited in claim 16, and said work contacting platen having a vertical adjustable resilient mounting whereby it is adjustable to hold the belt against the work with resilient pressure.

18. In a sanding machine, a supporting frame, a conveyor having a work supporting horizontal run mounted on said frame, and a sanding belt unit mounted on said frame above said conveyor, which sanding belt unit comprises a vertically disposed cross frame, a belt supporting work contacting roll at the lower end of said cross frame which is journaled at its opposite ends in bracket members which extend longitudinally at the sides of the supporting frame and which are pivotally mounted on said frame for swinging movement on transversely aligned axes, means for swinging said bracket members to raise and lower said contacting roll relative to the work supporting conveyor run, a belt tensioning roll at the upper end of said cross frame having its opposite ends journaled in bearing members, a vertical pivot mounting for one of said bearing members, the other one of said bearing members, having a horizontal slide thereon, a longitudinally extending, horizontal track on said cross frame which receives said slide, a pneumatic cylinder mounted on said cross frame and having its piston connected to said slide for moving the one end of the belt tensioning roll relative to the cross frame so as to maintain proper tracking of a sanding belt mounted on said upper and lower belt supporting rolls, and control means for said cylinder located on said cross frame adjacent the path of the side edge of the sanding belt which control means is actuated by lateral movement of the side edge of the sanding belt.

19. In a sanding machine, a supporting frame, a conveyor having a work supporting horizontal run mounted on said frame, and an upright sanding belt unit mounted on said frame above said conveyor, which sanding belt unit comprises a vertically disposed cross frame, a transversely extending belt supporting work contacting roller journaled at the lower end of said cross frame in transversely spaced bracket members which are pivoted on said frame for swinging movement on a transverse axis in laterally spaced vertical planes, means engaging said bracket members for swinging the same to adjust the vertical position of said contacting roll relative to the work supporting conveyor run, a belt tensioning roll at the upper end of said cross frame having its ends journaled in bearing members at opposite sides of said frame, one of said bearing members being mounted to pivot on a vertical axis, means supporting the other one of said bearing members for longitudinal sliding movement on said cross frame, a fluid operated cylinder mounted on said cross frame and having its piston connected to said other bearing member, and control means for said cylinder responsive to lateral movements of the side edge of a sanding belt mounted on said upper and lower belt supporting rolls for swinging said upper tensioning roll on its vertical axis whereby to maintain proper tracking of said sanding belt on said upper and lower belt supporting rolls.

20. In a sanding machine, an upright supporting frame, a conveyor mounted on said frame with a work supporting upper run thereof extending horizontally, and a sanding belt unit positioned above said horizontal conveyor run, said sanding belt unit comprising a transverse frame member extending over said horizontal conveyor run, a side frame forming a supporting bracket on one side of said upright supporting frame to which said transverse frame member is attached so that said transverse frame member extends in the form of a cantilever beam across said supporting frame, a belt supporting work contacting member having its ends journaled in bearing brackets depending from said cantilever beam, a belt tensioning roll mounted on a shaft having its ends journaled in bearing members extending above said cantilever beam, one of said bearing members being connected to said cantilever beam for movement about a vertically extending pivot axis, the other one of said bearing members having a horizontal sliding connection with said cantilever beam, a drive motor mounted on said side frame and having a power output shaft with a drive member thereon, a drive member on the tensioning roll shaft and an endless drive member extending between said motor and shaft drive members with the drive members operating in a vertical plane in which said pivot axis lies.

21. In a sanding machine, an upright supporting frame, a conveyor mounted on said supporting frame with a work supporting upper run thereof extending horizontally, and a sanding belt unit positioned above said horizontal conveyor run, said sanding belt unit comprising a transverse frame member extending over said horizontal conveyor run, a side frame forming an upstanding support on one side of said upright supporting frame to which said transverse frame member is attached so that said transverse frame member extends in the form of a cantilever beam across said supporting frame, a belt supporting work contacting roll having its ends journaled in bearing members below said cantilever beam, means for adjusting the position of said bearing members whereby to adjust the position of said work contacting roller relative to the work supporting conveyor run, a belt tensioning roll mounted on a shaft having its ends journaled in transversely spaced bearing members extending above said cantilever beam, one of said bearing members being mounted for swinging movement about a vertically extending pivot axis, the other one of said bearing members having a horizontal sliding connection with said cantilever beam, means for reciprocating said last mentioned bearing member, a drive motor mounted on said side frame and having a power output shaft with a drive member thereon, a drive member on the tensioning roll shaft and an endless drive member connecting said motor and shaft drive members with the drive members operating in a vertical plane in which said pivot axis lies.

References Cited in the file of this patent

UNITED STATES PATENTS

| | | |
|---|---|---|
| 1,927,330 | Williams | Sept. 19, 1933 |
| 1,936,991 | Pinkney | Nov. 28, 1933 |
| 2,064,476 | Johnson | Dec. 15, 1936 |
| 2,744,363 | Gluck | May 8, 1956 |
| 2,775,853 | Jones | Jan. 1, 1957 |
| 2,783,593 | Hercik | Mar. 5, 1957 |
| 2,804,723 | Sweeney | Sept. 3, 1957 |